US010789635B2

(12) United States Patent
Agarwal

(10) Patent No.: US 10,789,635 B2
(45) Date of Patent: Sep. 29, 2020

(54) METHOD AND SYSTEM FOR IMPLEMENTING A FOOD-SHARING APPLICATION PLATFORM

(71) Applicant: WHIRLPOOL CORPORATION, Benton Harbor, MI (US)

(72) Inventor: Megha Agarwal, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 281 days.

(21) Appl. No.: 15/814,499

(22) Filed: Nov. 16, 2017

(65) Prior Publication Data

US 2019/0147521 A1 May 16, 2019

(51) Int. Cl.
| | |
|---|---|
| *G06Q 30/06* | (2012.01) |
| *G06Q 10/08* | (2012.01) |
| *G06Q 30/02* | (2012.01) |
| *G06Q 20/20* | (2012.01) |

(52) U.S. Cl.
CPC ....... *G06Q 30/0631* (2013.01); *G06Q 10/087* (2013.01); *G06Q 30/0619* (2013.01); *G06Q 30/0621* (2013.01); *G06Q 30/0625* (2013.01); *G06Q 30/0627* (2013.01); *G06Q 30/0629* (2013.01); *G06Q 30/0633* (2013.01); *G06Q 20/203* (2013.01); *G06Q 30/02* (2013.01)

(58) Field of Classification Search
CPC .......... G06Q 30/0631; G06Q 30/0629; G06Q 30/0627; G06Q 30/0625; G06Q 30/0621; G06Q 30/0619; G06Q 30/0633; G06Q 30/0641; G06Q 20/203
USPC ............. 705/26.1, 26.44, 26.5, 26.61, 26.62, 705/26.63, 26.64, 26.7, 27.1
See application file for complete search history.

(56) References Cited

U.S. PATENT DOCUMENTS

| | | | |
|---|---|---|---|
| 7,321,866 B2 | 1/2008 | Kuwana et al. | |
| 9,275,393 B2* | 3/2016 | Argue | G06F 16/9535 |
| 9,832,821 B2* | 11/2017 | Unagami | G06Q 99/00 |
| 10,176,514 B1* | 1/2019 | Chen | G06Q 30/0201 |
| 2002/0107747 A1 | 8/2002 | Gerogianni | |
| 2008/0235232 A1* | 9/2008 | Moses | G06Q 10/10 |

(Continued)

FOREIGN PATENT DOCUMENTS

| | | | | |
|---|---|---|---|---|
| JP | 2013047905 A | * | 3/2013 | G06Q 50/22 |
| WO | 16176464 A1 | | 11/2016 | |

OTHER PUBLICATIONS

Article, UK intellectual property office grants trade mark "Pharmasutra" to pharmasutra ltd.; (Jun. 20, 2016). Plus Patent News Retrieved from Dialog Solutions on May 19, 2020.*

(Continued)

*Primary Examiner* — Yogesh C Garg
(74) *Attorney, Agent, or Firm* — McGarry Bair PC

(57) ABSTRACT

A system, platform, and method including a user interface adapted to receive a user input and communicatively connected with a communications module, a foodstuff database stored in memory including a set of available foodstuff transactions, and a controller module adapted to receive the user input receive at the user interface by way of the communications module, and configured to query the foodstuff database based on the user input, identify at least a subset of available foodstuff transactions based on the query, and send the identified subset of available foodstuff transactions to the user interface by way of the communications module.

11 Claims, 9 Drawing Sheets

(56) References Cited

U.S. PATENT DOCUMENTS

2009/0287644 A1* 11/2009 Crosby ............... G06F 19/3475
2012/0265632 A1    10/2012 Patro
2013/0317921 A1* 11/2013 Havas ................ G06Q 30/0633
                                                         705/15
2013/0325645 A1    12/2013 Thomas
2015/0088692 A1*  3/2015 Fung .................. G06Q 30/0623
                                                         705/26.61
2017/0213184 A1    7/2017 Lee et al.
2018/0157936 A1*  6/2018 Lee ....................... G06F 16/532
2018/0158010 A1*  6/2018 Greenberger .. G06Q 10/063112

OTHER PUBLICATIONS

Olio App, Olio Exchange Limited; iPhone app version 1.12.0 available Jul. 15, 2016; https://olioex.com/.

* cited by examiner

METHOD AND SYSTEM FOR IMPLEMENTING A FOOD-SHARING APPLICATION PLATFORM

BACKGROUND

Electronic devices are readily available. Mobile devices can include applications where a user can browse and select goods for sale, trade, or another transaction. Additionally, applications on mobile devices can include browsing and selecting recipes. Such recipes typically include list of ingredients needed as well as a list of instructions for preparation of the recipe.

BRIEF DESCRIPTION

In one aspect, the present disclosure relates to a method of implementing a food-sharing application platform including receiving, on a computer server, a foodstuff query from a food-sharing application user, the foodstuff query including a set of the user's available foodstuff items, accessing, by the computer server, a foodstuff database defining a set of available foodstuff from other users, accessing, by the computer server, a recipe database including at least one recipe having a list of foodstuff ingredients needed to prepare the at least one recipe, comparing, by the computer server, a combination of the set of the user's available foodstuff items and the set of available foodstuff with the list of foodstuff ingredients of the at least one recipe, identifying, by the computer server, the at least one recipe based on the comparing, identifying, by the computer server, available foodstuff needed to prepare the identified at least one recipe, and sending the identified at least one recipe and the available foodstuff needed to prepare the identified at least one recipe to the food-sharing application user.

In another aspect, the present disclosure relates to a method of implementing a food-sharing application platform including receiving, by a computer server, a list of authorized users from a food-sharing application user, receiving, by the computer server, a foodstuff query from the food-sharing application user, comparing, by the computer server, a comparison of the list of authorized users with a set of users associated with a set of available foodstuff transactions, identifying, by the computer server, a subset of available foodstuff transactions in a foodstuff database, based on the comparing, sending the subset of available foodstuff transactions to the food-sharing application user, and selecting, by the food-sharing application user, a foodstuff transaction from the subset of available food stuff transactions.

In yet another aspect, the present disclosure relates to a food-sharing system, including a user interface adapted to receive a user input and communicatively connected with a communications module, a foodstuff database stored in memory including a set of available foodstuff transactions and a set of locations associated with the set of available foodstuff transactions, and a controller module adapted to receive the user input received at the user interface by way of the communications module, and configured to query the foodstuff database based on the user input, identify at least a subset of available foodstuff transactions and the set of locations associated with the subset of available foodstuff transactions based on the query, and send the identified subset of available foodstuff transactions and set of locations associated with the subset of available foodstuff transactions to the user interface by way of the communications module.

DETAILED DESCRIPTION

Figure 1:
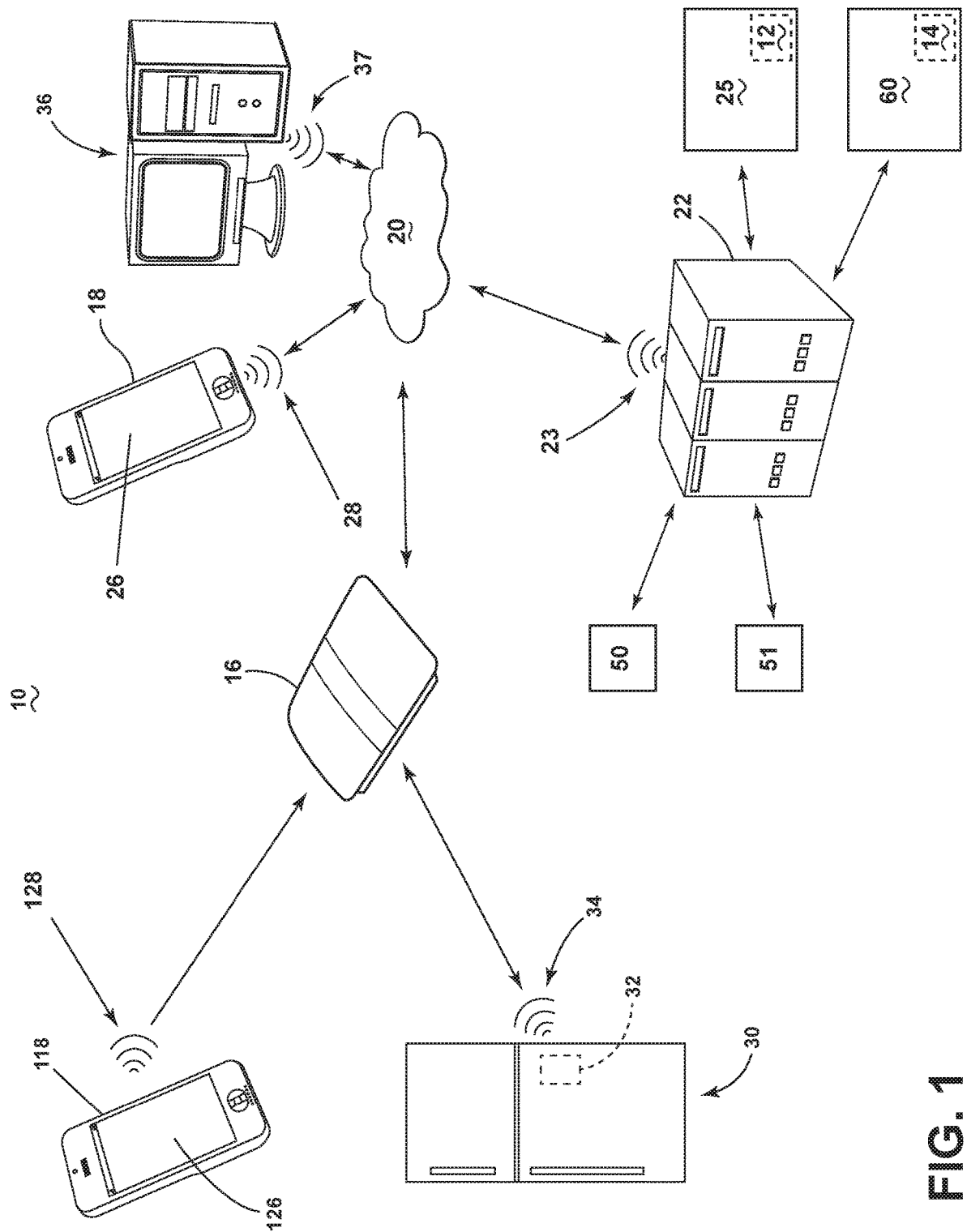
FIG. 1 is a schematic view of a network for exchanging information between a mobile device, a server, and a food-sharing application in accordance with various aspects described herein.

Aspects of the disclosure are directed toward a food-sharing application platform that enables users or households to share, sell, or otherwise offer food products to neighbors, charities, and food banks to prevent food waste. One third of all food produced in the world intended for human consumption is lost or wasted. In developed countries such as the US, over fifty percent of food waste or loss happens near consumption. Excess food that can otherwise spoil, go unutilized, or be otherwise wasted can be distributed by way of the food-sharing application platform disclosed herein to reduce hunger or food needs within the community. In one example, as disclosed herein, a food-sharing mobile application can enable or allow users share excess food with local personal networks, charities, or food banks. Commercial establishments like food banks and charities can accept excess food to further distribute to people in need. In yet another example, a food-sharing mobile application user can sell or trade excess food with other users.

A "seller" can upload a picture of food with a description and quantity. As used herein, a "seller" or "selling user" is a user offering at least some foodstuff for another user to obtain through, for example, sale, trade, or an offer without compensation (e.g. "free"). A "buyer" can search for specific food items listed in the food-sharing application platform and express interest in the food items. As used herein, a "buyer" or "buying user" is a user, different from the seller, who is accepting at least some foodstuff from another user through, for example, sale, trade, or receiving without payment. Aspects of the disclosure can be included wherein the "seller" or "selling user" is an offering party for any item transaction, the "buyer" or "buying user" is the receiving party for the item transaction, and the transaction does not necessitate the exchange of goods or services for the transaction to occur. Items sold can be monitored by predefined food categories and an admin dashboard.

Additional aspects of the disclosure can be included, wherein a user can save a trip to the grocery store when users need specific food items by searching for, and locating the specific food item nearby, by way of the food-sharing application platform. This enables the user to both avoid a trip to the grocery store, and allow the selling user to utilize an otherwise wasted food item. In another non-limiting aspect, the food-sharing application platform can enable localized users an opportunity to meet to exchange food items, allowing them to engage in social interaction. Stated another way, the food-sharing application platform can enable neighbors to meet each other within the community.

An "application," as used herein, can include an application programming interface (API) for interacting with the application or a user, and can enable accessing a communications network in which digital data can be stored or retrieved. The application can use a processor or controller module to operate, execute, or otherwise "run" the application and communicate with a network. Additionally, the application can use an interactive display or user interface to allow for user input in order for a user to manipulate the application.

The exemplary drawings are for purposes of illustration only and the dimensions, positions, order and relative sizes reflected in the drawings attached hereto can vary.

FIG. 1 is a schematic view of a data or communications network 10 according to one aspect of the disclosure. The network 10 can include wired, wireless, or a combination of wired and wireless points or nodes to connect communication paths for exchanging and transporting data. While wired, wireless, or a combination of wired and wireless points or nodes are described, the nodes can be communicatively connected with the network 10 by any suitable communication pathways. The network 10 can also include one or more networks 10 or subnetworks 10 in communication with each other. A "network" can include servers, databases, appliances, and mobile devices that can be in communication over a communications network, such as a middleware or cloud storage.

In one non-limiting aspect, the network 10 can include the internet (schematically represented as cloud 20), a home network, including a router 16, or the like. In this sense, a set of nodes can be adapted to be interconnected by way of the router 16, the Internet 20, a combination thereof, or communications therebetween. While "a set of" various elements will be described, it will be understood that "a set" can include any number of the respective elements, including only one element. Connection references (e.g., attached, communicatively connected, coupled, connected, and joined) are to be construed broadly and can include intermediate members between a collection of elements and relative communication between elements unless otherwise indicated. As such, connection references do not necessarily infer that two elements are directly connected and in a fixed or a direct communicative relation to each other.

A set of nodes in the network 10 can include, but are not limited to, a server 22 having a communicative connection 23, a first mobile device 18 (for example, a selling user's mobile phone) having a communicative connection 28, a second mobile device 118 (for example, a buying user's mobile phone) having a communicative connection 128, or the like. Non-limiting aspects of the disclosure are illustrated wherein either mobile device 18 or 118 can connect to the network 10, for example, by way of the router 16 or directly to the Internet 20. Additional or alternative nodes in the network 10 can include, but are not limited to, a computer, shown as a desktop computer 36 having a communicative connection 37, a foodstuff container 30, such as an appliance (illustrated as a refrigerator) having a communication connection 34.

In one non-limiting example, the first and second mobile devices 18 and 118 can comprise a processor or controller module, memory, one or more sets of executable instructions and be adapted for communicating with the network 10 by way of the communicative connection 28, 128, respectively. In one non-limiting example adaptation, the communicative connections 28, 128 of the respective first and second mobile devices 18 and 118 can include transmitting or receiving capabilities, including one or more antennae and executable instructions for transmitting or receiving communications by way of the antennae. Thus, aspects of the disclosure can be included wherein the communicative connections 28, 128 are enabled to send and receive messages or data to and from the network 10 or to and from nodes of the network 10. Such messages can include text, SMS, MMS, or other types of messages, or transmit or receive data in a form that can be translated and displayed as a message.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The first and second mobile devices 18 and 118 can further include respective mobile interactive displays 26, 126, respectively, which can provide users with access and control of the first and second mobile devices 18 and 118. In one non-limiting example, an interactive display 26, 126 can include a touch screen interface. While the first and second mobile devices 18 and 118 are illustrated and generally described in relation to a mobile phone, similarly adapted nodes can include, but are not limited to, a smartphone, a tablet computer, or the like.

In one non-limiting example, the desktop computer 36 can comprise a processor, memory, one or more sets of executable instructions and be adapted for communicating with the network 10 by way of the communicative connection 37. Non-limiting examples of the communicative connection 37 can include one or more antennae or a direct wired or conductive connection and executable instructions for transmitting or receiving communications to and from the network 10 or to and from nodes of the network 10. While the desktop computer 36 is illustrated, a similarly adapted node can include, but is not limited to, a laptop computer. The desktop computer 36 can include interactive elements for providing inputs, such as a keyboard, a mouse, a touch screen device, or a combination thereof, for interacting with executable applications.

The foodstuff container 30, illustrated as the refrigerator, can further include a foodstuff recorder, logger, sensor 32, or the like, adapted or configured to log, keep record of, or otherwise be made aware of foodstuff within the possession of a user, such as within the foodstuff container 30. As used herein, "foodstuff" can represent any food, consumable food item, or food-related instance of a quantifiable good. In this sense, "foodstuff" can include actual particular foods, such as apples, bananas, meats, cheese, or the like, desired foods, such as items included on a grocery list, or a sensing or measuring thereof. Non-limiting examples of sensors 32 can include radio frequency identification devices, image sensors, or the like. While only a single foodstuff container 30 is illustrated, aspects of the disclosure can be included wherein a set of foodstuff containers 30 (by way of non-limiting examples, a refrigerator, a deep freezer, and a pantry) can each independently or cumulatively be made aware of foodstuff within the possession of a user, and communicate the foodstuff to the network 10.

A router 16 is typically used in a home environment, and can be wired, wireless, or both, for communication between one or more nodes, including but not limited to mobile devices 18, 118, a desktop computer 36, a foodstuff container 30, or the network 10. The router 16 can exchange data and information from the set of nodes, and can further exchange information with the server 22 (i.e. via the Internet 20), as needed.

The server 22 can comprise a processor, memory, one or more sets of executable instructions and be adapted for communicating with the network 10 by way of the communicative connection 23. Non-limiting examples of the communicative connection 23 can include one or more antennae or a direct wired or conductive connection and executable instructions for transmitting or receiving communications to and from the network 10 or to and from nodes of the network 10. Non-limiting examples of the server 22 can include a general purpose computer or server used by a manufacture, provider, or retailer of goods or services, and can communicate information and data to the network 10, which can include or can provide access to a set of various databases 25, 50, 51, 60 accessible by or stored in memory on the server 22.

The databases 25, 50, 51, 60 can include particularized information, such as a registered user database 50 adapted or configured to authorize or store a set of users associated with an application. For example, users operating a subset of the nodes, such as the first and second mobile devices 18 and 118 or desktop computer 36 can execute an application directed to a food-sharing application platform, wherein the users have user identification, authorization, accounts, or the like, stored at the registered user database 50, and accessible by the server 22. Information stored in the registered user database 50 can originate from a user account. A user can have an account where nodes such as first and second mobile devices 18 and 118, desktop computer(s) 36, foodstuff container(s) 30, or the like, owned or otherwise within the possession or operational control of the user is registered to the account. Information stored in the registered user database 50 can further include a geographic location associated with the user, or a set or subset of the aforementioned nodes. The registration information can include inputs to the account by manual user input in an application, automatic discovery of information associated with the node (e.g. geographic location data) discovered by an application or defined by the node device (e.g. a mobile device 18, 118 "location") and transmitted to the registered user database 50.

In another non-limiting example, the databases 25, 50, 51, 60 can include a user-associated foodstuff database ("user foodstuff database") 51 adapted or configured to, for instance, receive and store data related to foodstuff within the possession of a particular user. In another non-limiting example, the user foodstuff database 51 can include information, data, or foodstuff items identified, sensed, or otherwise populated by the set of foodstuff container 30 nodes or sensor(s) 32, and associated with a particular user, as logged or defined at the registered user database 50. Additional aspects of the disclosure can be included wherein the user foodstuff database 51 is adapted to receive or store data manually inputted by the respective user.

The databases 25, 50, 51, 60 can further include a recipe database 25 having memory storing a set of recipes 12. Non-limiting examples of the recipe database 25 or set of recipes 12 can include foodstuff items, foodstuff item quantities, directions or instructions, or the like, for completing, executing, or otherwise preparing the recipe. In this sense, the recipe database 25 or set of recipes 12 can include the directions and data requested, required, needed, or the like, to cook or prepare the associated recipe. It is contemplated that the recipe database 25 can include the set of recipes 12 from a third party, or stored by a user.

The databases 25, 50, 51, 60 can further include a foodstuff transaction database 60 having memory for storing a set of foodstuff transactions 14. As used herein, a "foodstuff transaction" can include an available transaction of foodstuff, offered by a selling user, and data related thereto. For example, a foodstuff transaction 14 can include a description of the food item offered, a picture of the food item, a desired price for the food item, or the like. As used herein, an "available" foodstuff transaction 14 can further include an open or unfulfilled transaction request, such as a foodstuff item offered for sale that has not yet been accepted.

Non-limiting aspects of the server 22 can be included wherein access to one or more of the databases 25, 50, 51, 60, contents, or data entries thereof, is controlled via the server 22. While a set of databases 25, 50, 51, 60 are illustrated and described, non-limiting aspects of the disclosure can be included wherein the data described, associated, or otherwise stored in the set of databases are contained within a single or a set of fewer databases than shown. Additionally, aspects of the disclosure can be included wherein the set or a subset of the databases 25, 50, 51, 60 are adapted or configured to communicate with one another directly. In this sense, network nodes that can access the server 22 via the network 10 can only receive or submit data controlled or otherwise authorized by the server 22. Stated another way, while the network 10 nodes can access the server 22, aspects of the disclosure can be included wherein the network 10 nodes cannot access the set of databases 25, 50, 51, 60 directly.

Accordingly, the server 22 can be configured to query the databases 25, 50, 51, 60 for information. The server 22 can also be used to search or query data, generate data, and send data over the network 10 to a node in response to a query originating by the node. While only one server 22 is shown in FIG. 1, it should be understood that the network 10 can include multiple servers 22. Non-limiting aspects of the disclosure can include a local copy of a subset of data, databases 25, 50, 51, 60, or the like, stored at or proximate to the nodes, including predefined or prepopulated data entries, wherein the respective nodes can interact with the local copy of the data in contrast with the server 22 or databases 25, 50, 51, 60.

Figure 2:
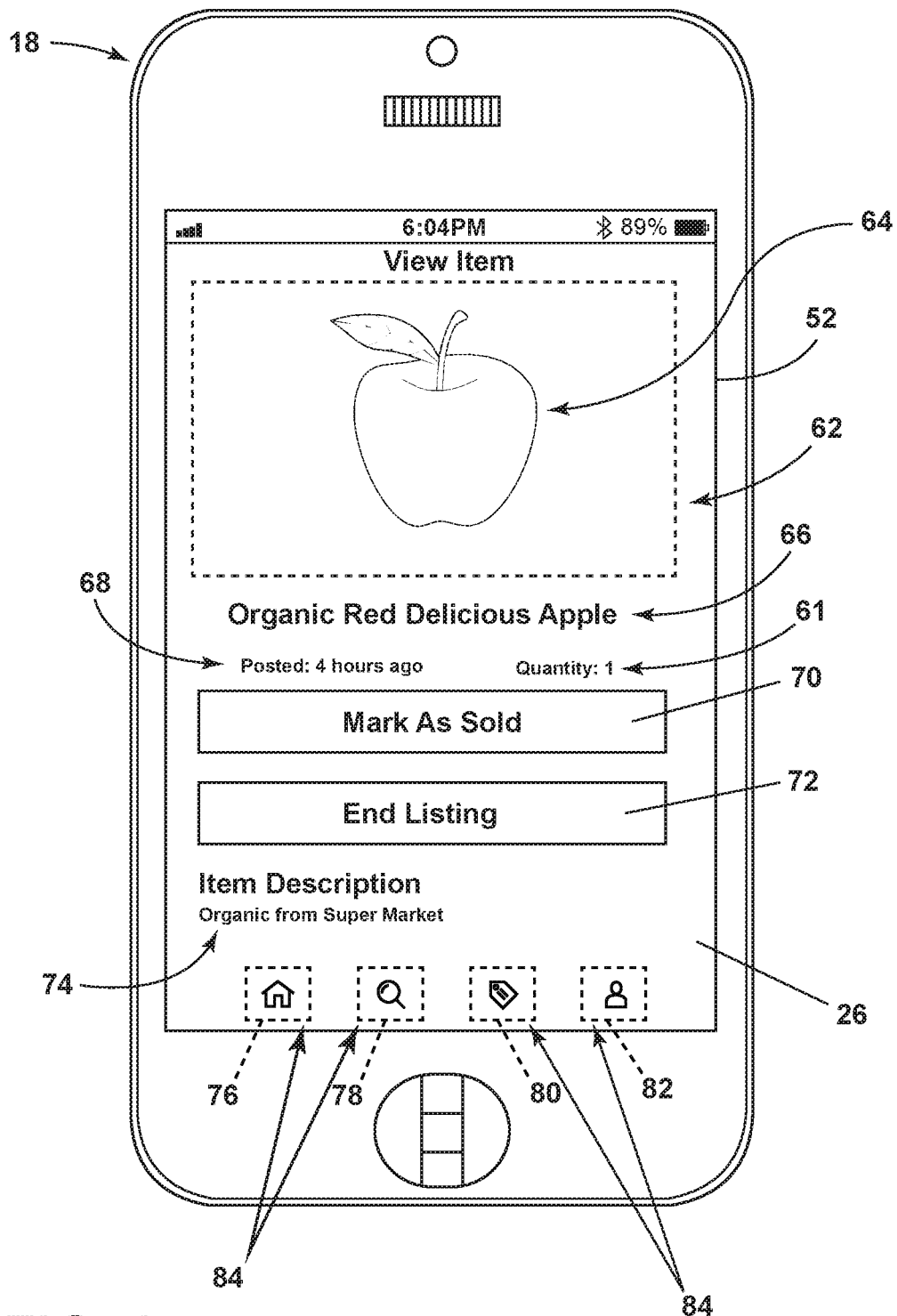
FIG. 2 is a schematic view of an exemplary mobile device with a mobile interactive display demonstrating a selling user's view of an offer for a foodstuff transaction, in accordance with various aspects described herein.

FIG. 2 illustrates an exemplary instance of the food-sharing application platform, which can be accessed by one or more of the aforementioned nodes, illustrated as the first mobile device 18 having the interactive display 26. While the first mobile device 18 is shown and described going forward, non-limiting aspects of the disclosure can equally be applied or enabled on the second mobile device 118, the desktop computer 38, or the like. As shown, the interactive display 26 can include a touch screen 52 for displaying or interacting with a food-sharing application platform user interface (UI). In one non-limiting aspect, the food-sharing application platform can include a selling or seller's UI 62 viewable to a user submitting a foodstuff transaction by way of the food-sharing application. In one non-limiting example aspect of the disclosure, data, information, representations, or the like, or a combination thereof (hereafter, the "foodstuff transaction data"), can collectively define a foodstuff transaction 14. In the illustrated example of FIG. 2, the foodstuff transaction 14 is an offer to sell, trade, or the like, a single organic red delicious apple.

As previously described, a user's input of the foodstuff transaction data can be transmitted from the user's device (e.g. the mobile device 18, desktop computer 36, or the like) to the server 22 via the network 10, and stored at or in the foodstuff transaction database 60. In one non-limiting example, the foodstuff transaction data can only be saved or stored in the foodstuff transaction database 60 upon authorization or verification of the user or user account, as compared or validated by the registered user database 50.

The selling UI 62 can include, but is not limited to, foodstuff transaction data such as a graphical or pictorial representation 64 of a foodstuff item and a textual description 66 of the foodstuff item being offered in the foodstuff transaction 14. The graphical representation 64 of the foodstuff item can be, for example, captured and imported by a user, such as by way of the mobile device camera or image capture device, an interface therefore, or can be selected by a user from a preexisting database of foodstuff images. In one non-limiting example, the preexisting database of foodstuff images can be stored in the food-sharing application platform data, downloaded as-needed, or retrieved from the server 22 or a database 25, 50, 51, 60 thereof. The textual description 66 of the foodstuff item can include a brief description of the foodstuff item being offered in the foodstuff transaction 14, as described by the seller, or as selected by the seller from a list of predefined textual selections.

The selling UI 62 can further include additional data or information related to the foodstuff item being offered in the foodstuff transaction 14, including but not limited to a detailed item description 74 for additional details related to the foodstuff item or details of the foodstuff transaction 14 (e.g. pick up location, dietary restrictions, when originally purchased, etc.). The selling UI 62 can also include data or information related to the posting 68 (e.g. "Posted: 4 hours ago") or quantity of items 61 being offered (e.g. "Quantity: 1") in the foodstuff transaction 14. In one non-limiting example, the information related to the posting 68 can be automatically generated by at least one of the food-sharing application platform, the node or mobile device 18, the server 22, or data stored in the set of databases 25, 50, 51, 60. Thus, in one non-limiting example, the foodstuff transaction 14 can comprise a set or subset of data including, but not limited to, the graphical representation 64 of the item, the textual description 66 of the item, the detailed item description 74, data or information related to the posting 68, the quantity of items 61 being offered, a price requested for the item, or the like.

The selling UI 62 can further include action indicator buttons for implementing actions available to the seller. For example, as shown, a first action indicator button 70 can allow, execute, or otherwise enable the marking of the foodstuff item being offered in the foodstuff transaction 14 as "sold" or otherwise unavailable for offer to another user. In another non-limiting example, a second action indicator button 72 can allow, execute, or otherwise enable the ceasing or ending of the listing, for example, without a sale or transaction occurring. While the first and second action indicator buttons 70, 72 allow a seller to remove the foodstuff transaction 14 from "available" listings (that is, available to complete the transaction), it is understood that the foodstuff transaction 14 may not necessarily be removed from the server 22, the set of databases 25, 50, 51, 60, or the food-sharing application platform, but rather it is filtered, hidden, or otherwise not displayed along with the remaining available foodstuff transactions 14.

Additional aspects of the disclosure can include a set of navigation buttons 84 that can be consistently located or organized relative to one or more of the UI 61 views of the food-sharing application platform. For example, as shown, a non-limiting set of navigation buttons 84 can include, but is not limited to, a home button 76 configured to direct the user to a "home" user interface, a search button 78 configured to direct the user to a "search" or query user interface, a transaction button 80 configured to direct the user to a foodstuff transaction user interface, and a user button 82 configured to direct the user to a user account user interface.

While a set of foodstuff transaction data elements 61, 64, 66, 68, 70, 72, 74 are shown and described, additional foodstuff transaction data elements can be included. For example, a seller can set a desired price for the foodstuff transaction 14, a time or date for automatic expiration of the foodstuff transaction 14, a category of the foodstuff item, or the like. In another non-limiting example, the category of the foodstuff item can be selected from a predefined category list including, but not limited to: baking, spices, canned goods, dairy, drinks, beverages, grains, cereal, frozen food, meat, fish, produce, snacks, or the like. In yet another non-limiting example, a user can select a set of categories from the predefined category list. In yet another non-limiting example, the expiration of the foodstuff transaction 14 can be automatically determined by the food-sharing application platform based on the set of foodstuff transaction data elements. For example, the food-sharing application platform can automatically determine or calculate an automatic expiration of the foodstuff transaction based on the selected category of the foodstuff item. Furthermore, aspects of the disclosure can be included wherein any combination of textual, graphical, or preselection options or user inputs can be provided for the set of foodstuff transaction data elements 61, 64, 66, 68, 70, 72, 74.

Figure 3:
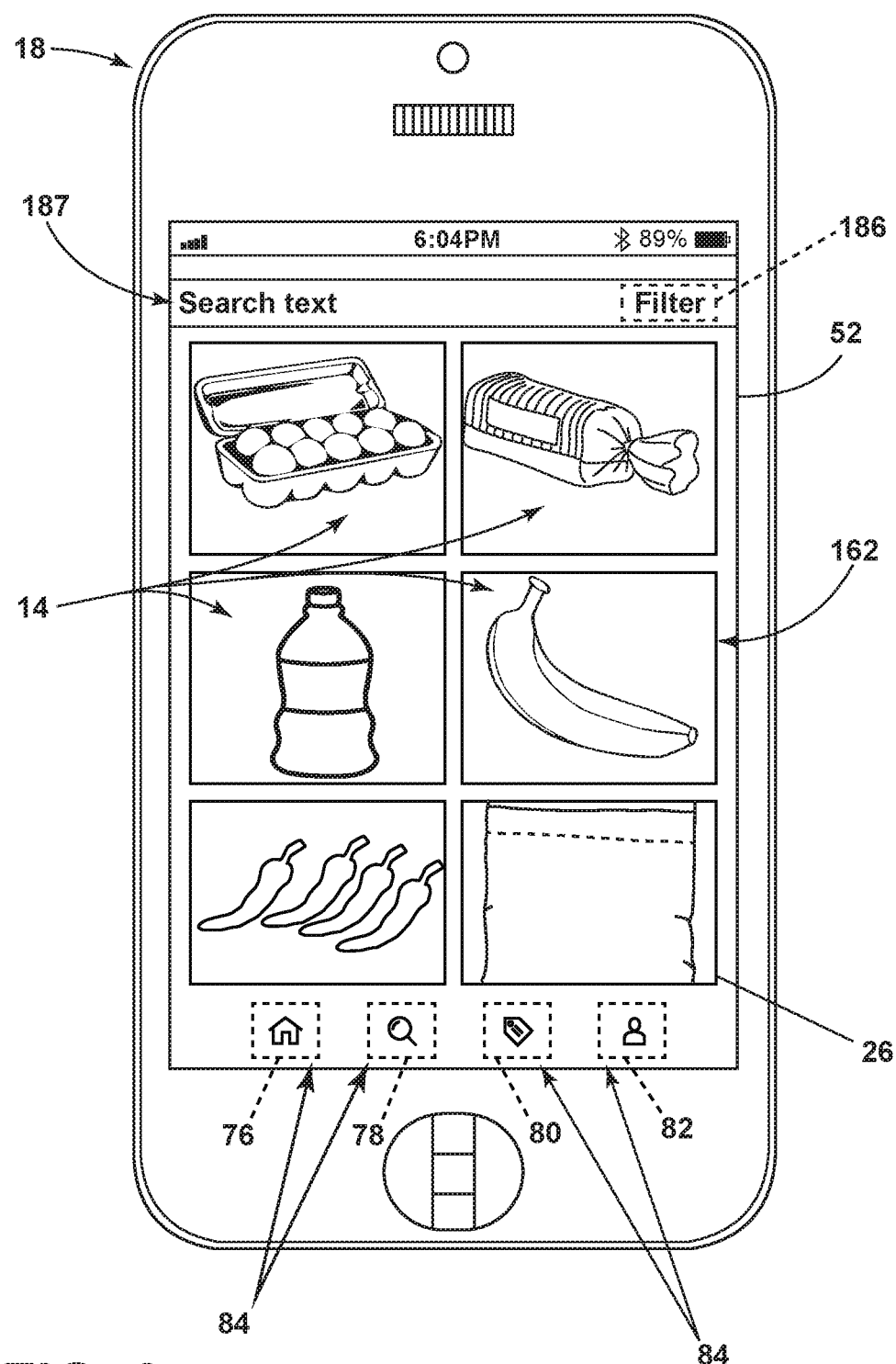
FIG. 3 is a schematic view of an exemplary mobile device with a mobile interactive display demonstrating a view of available foodstuff transactions, in accordance with various aspects described herein.

FIG. 3 illustrates another UI for the food-sharing application platform, such as a searching or query UI 162. The searching UI 162 can be similar to the selling UI 62; therefore, like parts will be identified with like numerals increased by 100, with it being understood that the description of the like parts of the aforementioned UI 62 applies to the searching UI 162, unless otherwise noted. In one non-limiting aspect, the searching UI 162 is viewable to a user searching or querying the food-sharing application platform, the server 22, or a set of the databases 25, 50, 51, 60 for an available foodstuff transaction 14. While "searching" or "querying" the food-sharing application platform is described, non-limiting aspects of the disclosure can be included wherein the "search" or "query" includes comparing at least a subset of data of the databases 25, 50, 51, 60 with the search or query terms, identifiers, or the like, and returning a subset of results, wherein the comparison indicates a match between the subset of results and the query terms, identifiers, or the like.

In one non-limiting example of the searching UI 162, the display 26 can be prepopulated, or populated in response to a search query, with a set of available foodstuff transactions 14 submitted by other users of the food-sharing application platform. For instance, the set of available foodstuff transactions 14 can be represented by one or more graphical or pictorial representations (such as the graphical representation 64 of FIG. 2), a brief textual description (such as the textual description 66 of FIG. 2), the like, or a combination thereof. In another non-limiting example, a user can query the food-sharing application platform, the server 22, or a set of the databases 25, 50, 51, 60 for particular text contained in an available foodstuff transaction 14 by way of a textual search input 187. In yet another non-limiting example, a user can query the food-sharing application platform, the server 22, or a set of the databases 25, 50, 51, 60 based on a filtered set of categories, by selecting a filter button 186, enabling a user to filter the available foodstuff transactions 14 based on one or more filtering categories.

Non-limiting aspects of the disclosure can be included wherein a user can submit a search, a query, a set of filtering or sorting categories, or a combination thereof, by way of the network to the server or a subset of the databases 25, 50, 51, 60. In one instance, the server 22 can be adapted to query the foodstuff transaction database 60 by way of the network 10 and server 22, and the server 22 can respond to the search, query, or filtering by returning a set or subset, or at least one available foodstuff transaction 14 matching the search, query, or filter. In one non-limiting example, the returned set or subset of the at least one available foodstuff transactions 14 can be categorized by one or more categories, as explained herein. For example, as shown, categories can include search results organized by produce (e.g. represented by a banana), dairy (e.g. represented as a milk jug), grains (e.g. represented by a loaf of bread), or the like.

As explained above, the at least one available foodstuff transaction can include an open or unfulfilled foodstuff transaction 14, including transaction or item details previously described. For instance, as shown, the server 22 can respond to the search, query, or filtering by returning a set or subset of foodstuff transactions 14, by way of returning a graphical representation of the matching set or subset of foodstuff transaction 14. The at least one available foodstuff transaction 14 matching the search, query, or filter can, in turn, be returned to the user via the server 22 and network 10, and displayed as an available foodstuff transaction 14 of the searching UI 162. In one non-limiting example, the available foodstuff transactions 14 displayed in the searching UI 162 can be selectable, such that selection of at least one available foodstuff transaction 14 navigates to another UI adapted or configured to view details of the available foodstuff transaction 14. In one non-limiting aspect of the disclosure, the search terms, filtering, sorting, the like, or a combination thereof can be a "foodstuff query."

Figure 4:
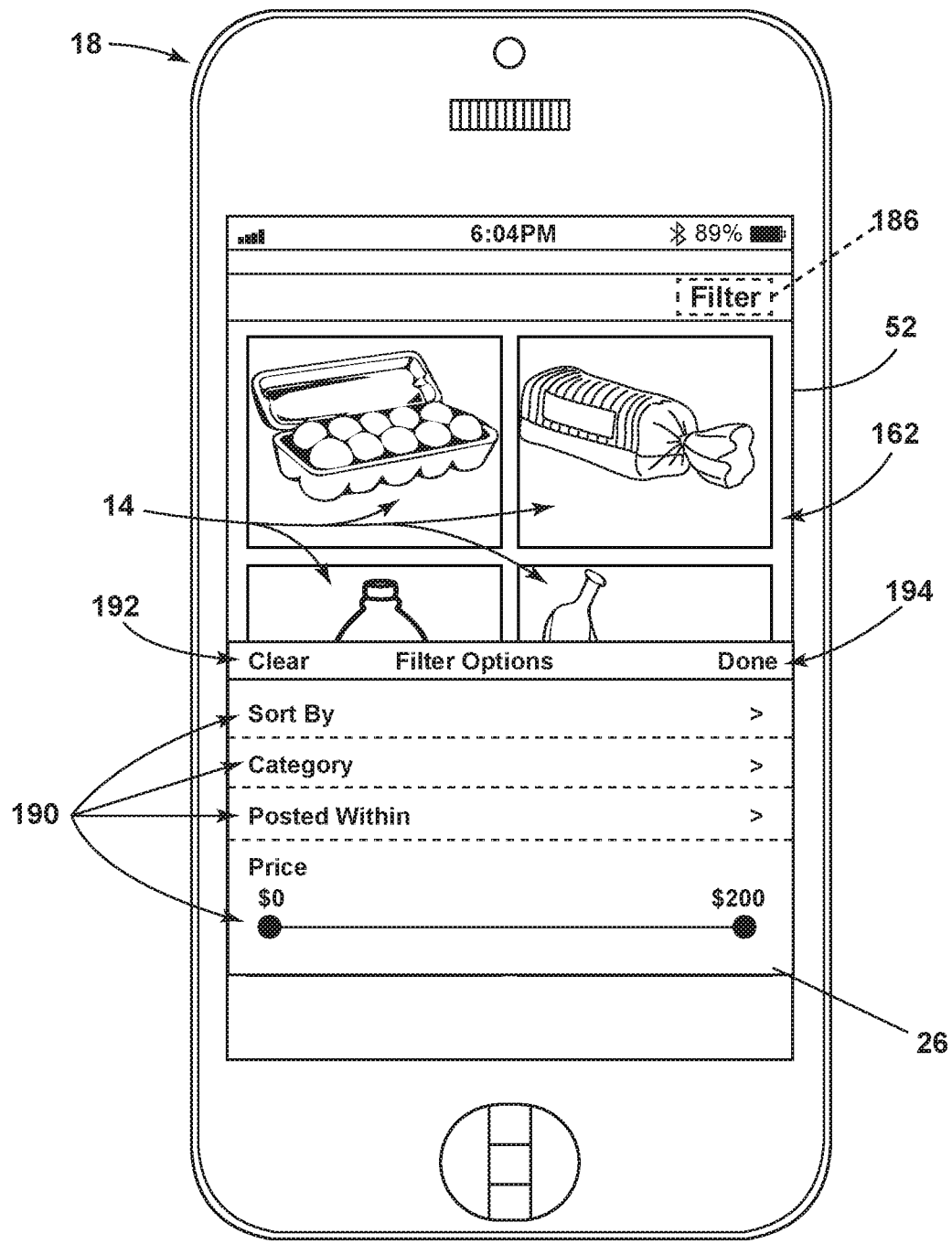
FIG. 4 is a schematic view of the mobile interactive display of FIG. 3 including a set of filters for filtering the available foodstuff transactions, in accordance with various aspects described herein.

FIG. 4 illustrates another aspect of the searching UI 162, showing a non-limiting set of filtering categories 190 available to a searching user, upon selection of the filter button 186. As shown, the set of filtering categories 190 can include, but are not limited to, sorting the results by various selections, filtering by category of results (e.g. baking, spices, meat, etc.), filtering by a period of time (e.g. "Posted Within"), filtering by price of the available foodstuff transaction 14, or a combination thereof. As previously mentioned, the "results" that can have filters applied can include prepopulated available foodstuff transactions 14 (e.g. recently posted items, popular items, etc.), or available foodstuff transactions 14 populated in response to a search query. Additional sorting or filtering options can be included, including but not limited to, sorting by proximity or distance relative to the user performing the searching or filtering, whether the seller associated the available foodstuff transaction 14 is a member of one or more user groups associated with the user performing the searching or filtering, which available foodstuff transactions 14 are expiring the soonest or latest, or the like. The searching UI 162 is also shown including a "clear" button 192, which can be adapted to remove all searching or filtering options have that been included, or a "done" button 194, which can be adapted to remove or rescind the set of filtering categories 190, for example, so the searching or filtering user can review the available foodstuff transactions 14 populated by the searching or filtering.

Figure 5:
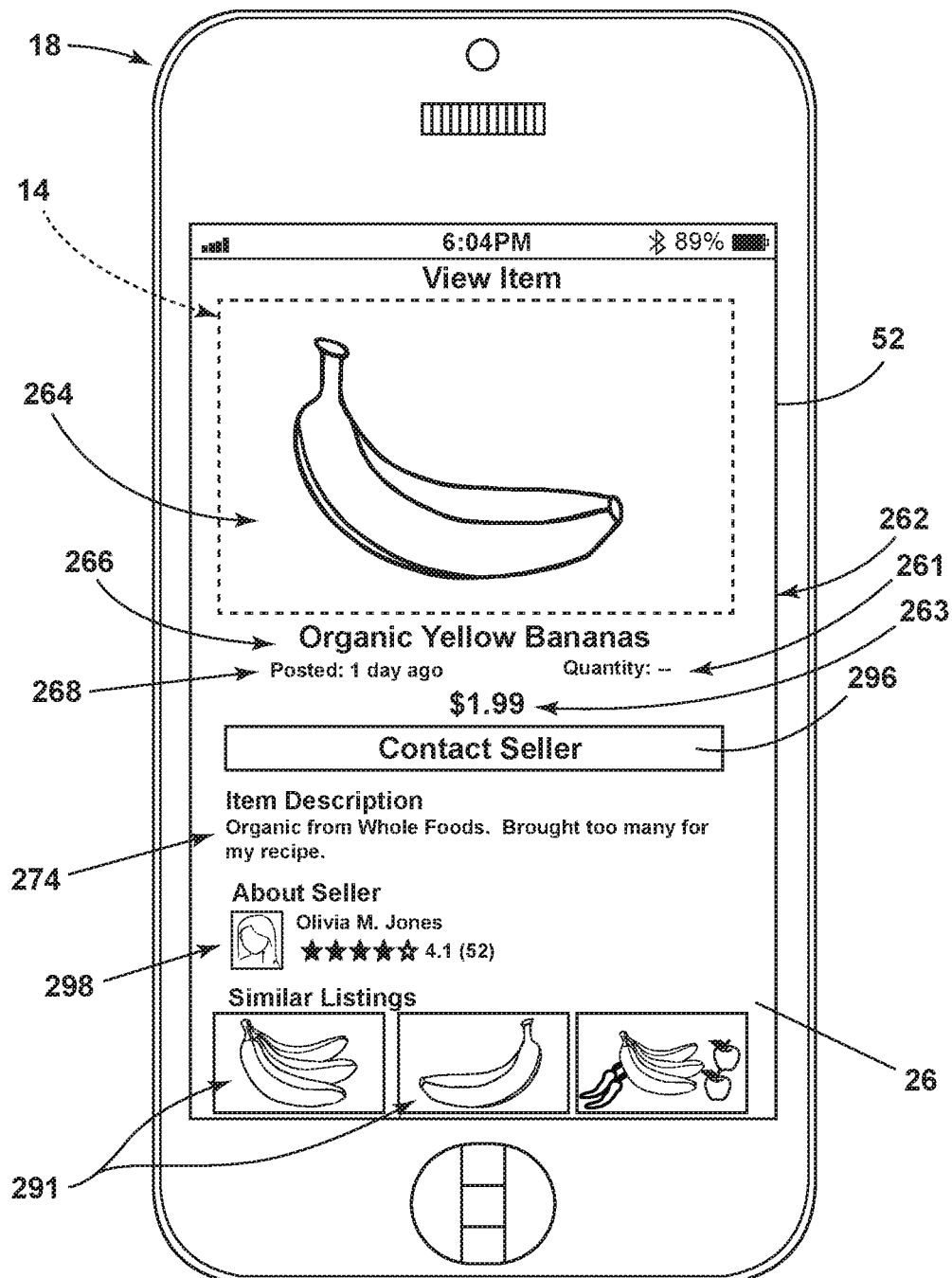
FIG. 5 is a schematic view of an exemplary mobile device with a mobile interactive display demonstrating a buying user's view of an offer for a foodstuff transaction, in accordance with various aspects described herein.

FIG. 5 illustrates another UI for the food-sharing application platform, such as a buying UI 262. The buying UI 262 can be similar to the aforementioned UIs 62, 162; therefore, like parts will be identified with like numerals increased by 200, with it being understood that the description of the like parts of the aforementioned UIs 62, 162 applies to the buying UI 262, unless otherwise noted. In one non-limiting aspect, the buying UI 262 is viewable to a user who selects an available foodstuff transaction 14, for example as described in FIG. 3. Upon selection of the available foodstuff transaction 14 by a user, the buying UI 262 can be populated with available foodstuff transaction 14 details, for example, delivered from the foodstuff transaction database 60, by way of the server 22, the network 10, the food-sharing application platform, or a combination thereof. In the illustrated example of FIG. 5, the foodstuff transaction 14 is represented as an organic yellow banana offered for sale, for the price of $1.99.

A non-limiting example set of data delivered to the buying UI 262 can include a graphical or pictorial representation 264 of the foodstuff, and a textual description 266 of the foodstuff item, data or information related to the posting 268 (e.g. "Posted: 1 day ago") or quantity of items 261 being offered in the foodstuff transaction 14, a detailed item description 274 for additional details related to the foodstuff item or details of the foodstuff transaction 14, or a requested price 263 for the foodstuff transaction 14. The set of foodstuff transaction data elements 261, 263, 264, 266, 268, 274 can at least partially comprise the same set of foodstuff transaction data elements 61, 64, 66, 68, 74 received by the selling user, and corresponding to inputs received in accordance with FIG. 2.

The buying UI 262 can further include a "contact seller" button 296, or another mechanism to initiate contact with the seller of the available foodstuff transaction 14, for example, to ask additional questions related to the available foodstuff transaction 14 or transaction, negotiate on price or trade, to arrange a pick up location, or the like. A buying user can further view a user summary 298 for the selling user, which for instance can include, but is not limited to, a user's photo, name, and a seller rating, represented by a numeric or graphical indication, cumulative ratings number, or the like. In another non-limiting example of the buying UI 262, a grouping of other similar listings 291 of available foodstuff transactions 14 can be presented to the buying user. For example, similar listings 291 of a particular available foodstuff transaction 14 (e.g. a banana) can include additional available foodstuff transactions 14 for other bananas. In another non-limiting example, similar listings 291 can be determined, shown, or included based on a searching or buying user's search history, proximity to the available foodstuff transaction 14, food category, or another determination or filtering-type of determination.

Figure 6:
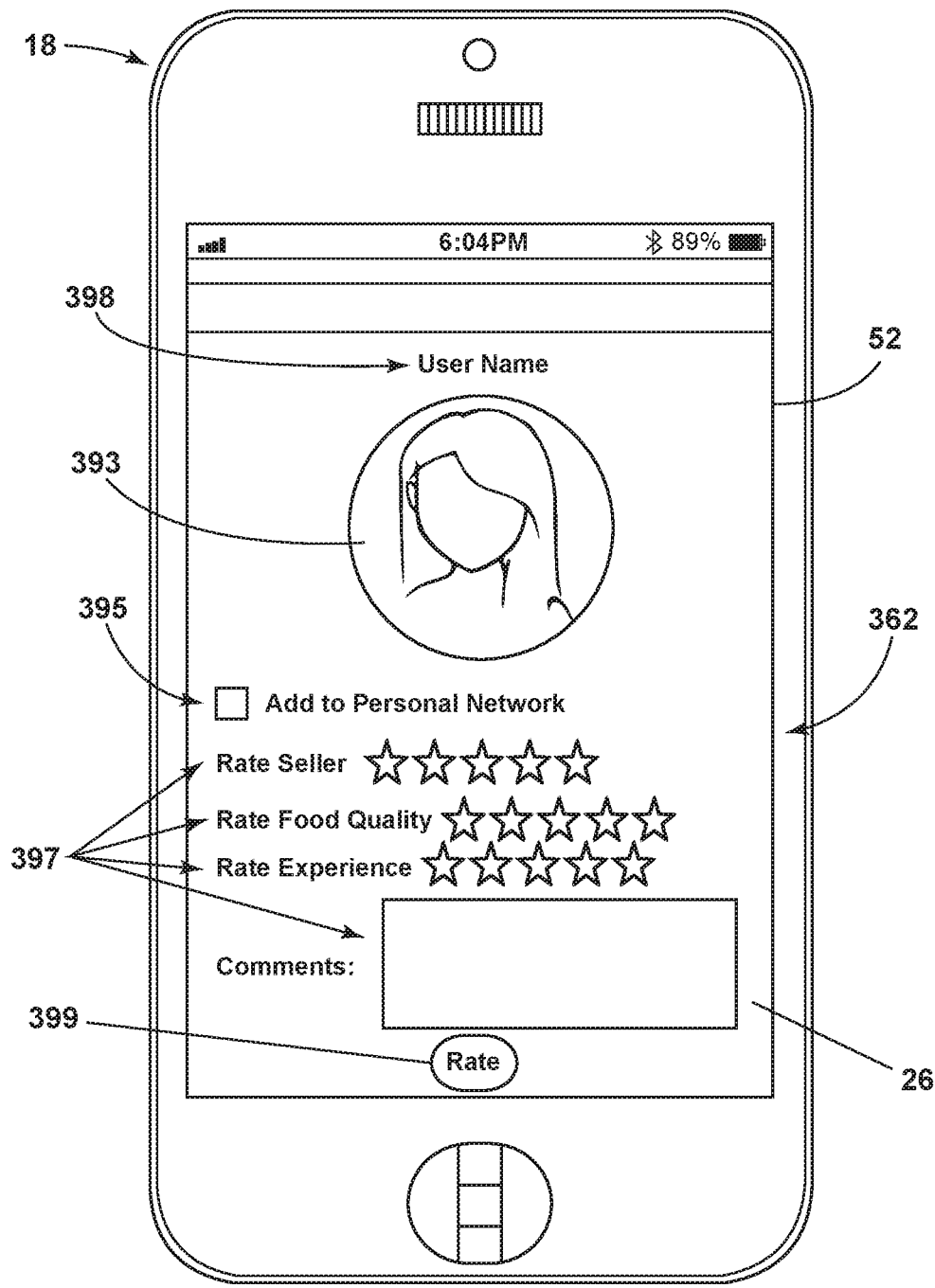
FIG. 6 is a schematic view of an exemplary mobile device with a mobile interactive display demonstrating a user's view for rating another foot-sharing application user, in accordance with various aspects described herein.

FIG. 6 illustrates another UI for the food-sharing application platform, such as a user rating UI 362. The user rating UI 362 can be similar to the aforementioned UIs 62, 162, 262; therefore, like parts will be identified with like numerals increased by 300, with it being understood that the description of the like parts of the aforementioned UIs 62, 162, 262 applies to the user rating UI 362, unless otherwise noted. In one non-limiting aspect, the user rating UI 362 is viewable to a user who completes a transaction with another user, communicates with another user, or otherwise selects an option to rate another user. Upon selection of the desire to rate another user by the rating user (i.e. the user that will view and interact with the user rating UI 362), the user rating UI 362 can be populated with a set of data or details, for example, delivered from the registered user database 50, by way of the server 22, the network 10, the food-sharing application platform, or a combination thereof. For instance, a user account populated by the registered user database 50, for rating the user in the user rating UI 392 can include, but is not limited to, a picture or avatar 393 of the user or user account, a user name 398 for the user or user account, and a set of rating selections 397 for rating the user or user account based upon transaction experience or other interaction experiences with that user or user account.

Non-limiting examples of the set of rating selections 397 can include a "rate seller" entry for the rating user to rate the seller, a "rate food quality" entry for the rating user to rate the quality of the food transaction 14 or food item, a "rate experience" entry for the rating user to rate the overall experience of the interaction or transaction, and a "comments" text box for the rating user to add any other text related to rating the user they would like. The user rating UI 362 can also include a confirmation or "rate" button 399 that submits or uploads the rating data. The submitted or uploaded rating data can be provided from the rating user, the mobile device 18, or the like, to the server 22, the registered user database 50, or the like, via the network 10. The submitted rating data can, in turn, affect a user's ratings or the user summary 298 viewable to other users of the food-sharing application platform.

The rating user can also optionally have the choice to add the user or user account to one or more personal networks associated with the rating user. For example, the user rating UI 392 can include a selection 395 to authorize, approve, or otherwise add the user or user account to the "personal network," as shown. In this sense, the rating user's personal network can define a list of other trusted or preferred rated users the rating user has chosen. In one non-limiting example a rating user can include a set of different personal networks, and the rating user can select which of the set of personal networks to add the rated user to. Aspects of the disclosure can be included wherein, for example, searching or filtering by way of the searching UI 162 can include options to searching or filtering via the set of personal networks for the searching user.

Figure 7:
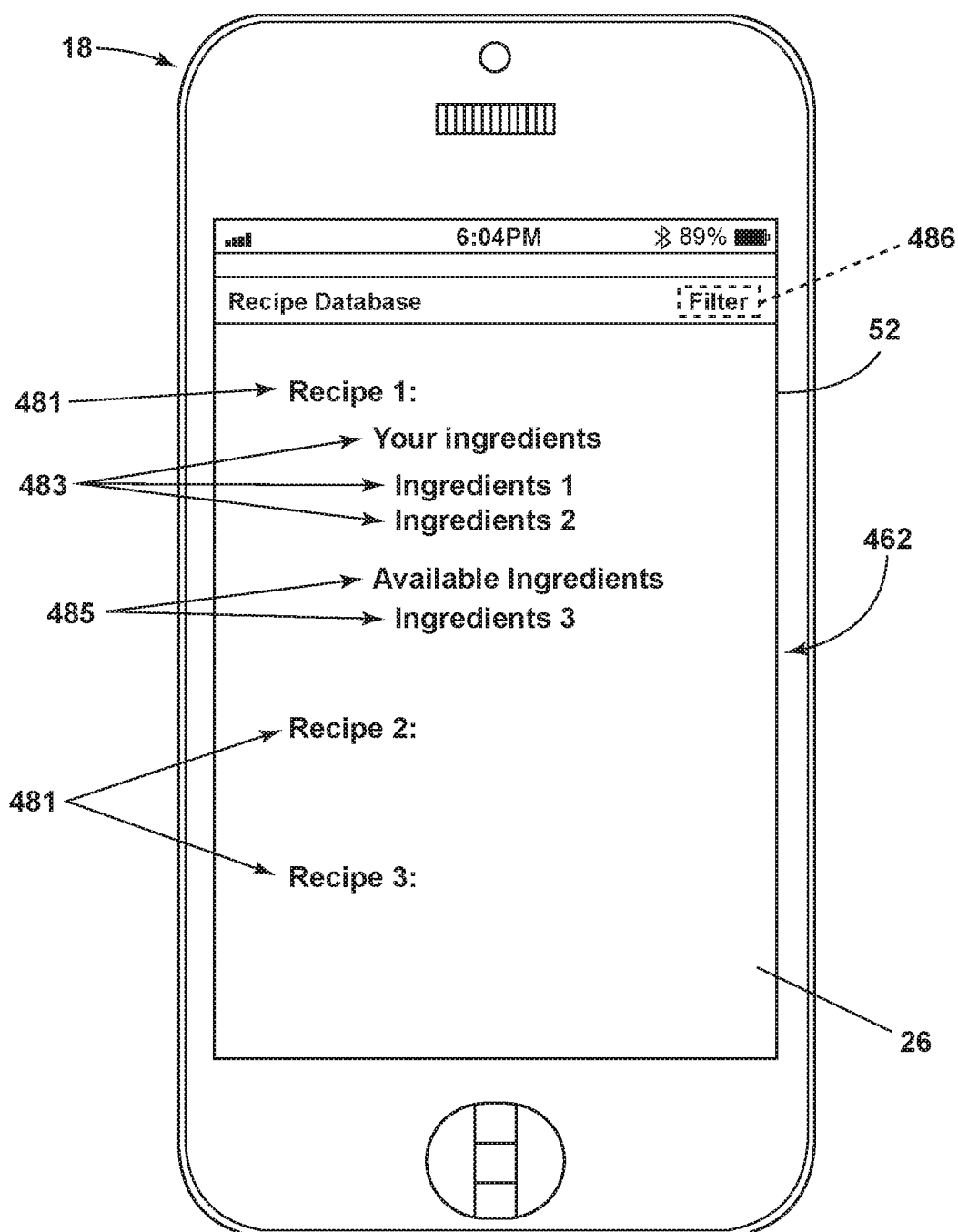
FIG. 7 is a schematic view of an exemplary mobile device with a mobile interactive display demonstrating a view of a recipe database, in accordance with various aspects described herein.

FIG. 7 illustrates another UI for the food-sharing application platform, such as a recipe UI 462. The recipe UI 462 can be similar to the aforementioned UIs 62, 162, 262, 362; therefore, like parts will be identified with like numerals increased by 400, with it being understood that the description of the like parts of the aforementioned UIs 62, 162, 262, 362 applies to the recipe UI 462, unless otherwise noted. In one non-limiting aspect, the recipe UI 462 is viewable to a user who desires to cook, assembly, complete, or otherwise perform food-related activities in accordance with a recipe. In one non-limiting example, a user may desire to cook a recipe, but does not have a recipe identified. In another non-limiting example, a user can be unaware of the foodstuff items in their own possession or control when deciding or determining what recipe to prepare.

Non-limiting aspects of the disclosure can be included wherein the food-sharing application platform can utilize the set of various data stored in the set of databases 25, 50, 51, 60, the server 22, or a combination thereof, and generate one or more recipes delivered to the recipe UI 462 by way of the server 22 or network 10, for the user's review or selection. For instance, a set of recipes 481 can be presented on the recipe UI 462, which can further list ingredients required 483, 485 to perform the recipe, instructions for performing the recipe, or a combination thereof. Furthermore, non-limiting aspects of the disclosure can be included wherein the food-sharing application platform can include, present, suggest, or otherwise offer a set of recipes 481 to the user via the recipe UI 462 based on available foodstuff transactions 14 included in the food-sharing application platform.

For example, if the food-sharing application platform determines there are available foodstuff transactions 14 in the foodstuff transaction database 60, and that the viewing user is proximate to an available foodstuff transaction 14 for poultry, the recipe UI 462 can search or query the recipe database 25 (via the server 22 or network 10) for a set or subset of recipes 12 that include poultry as an ingredient or component of the recipe 12. The server 22, the network 10, the food-sharing application platform, or a combination thereof, can return the set or subset of recipes 12 meeting the poultry ingredient requirement to the recipe UI 462 of a viewing user as the set of recipes 481 illustrated. The set of recipes 481 in the recipe UI 462 can further link to or identify the ingredient identified as the available foodstuff transaction 14 (i.e. the poultry) under a special heading or organization (e.g. "available ingredients" 485). A viewing user can then select the selectable available ingredients 485, and review the available foodstuff transaction 14 details, for example, by way of the buying UI 262. Non-limiting examples of the food-sharing application platform can be included wherein, for example a recipe 481 or a set of recipes 481 are identified to the viewing user based on more than one available foodstuff transactions 14. Furthermore, the set of recipes 481 identified to the viewing user can be further searched or filtered by way of a filter button 486, using filtering selections as described herein.

In yet another non-limiting aspect of the disclosure, the food-sharing application platform, the server 22, the recipe UI 462, or a combination thereof can further search, query, compare, or the like, the recipe database 25 based not only on a determination that there are available foodstuff transactions 14 in the foodstuff transaction database 60 that relate to a set or subset of recipes 12, but also based on foodstuff items within the possession of the viewing user. For example, in aspects of the disclosure wherein a foodstuff container 30 associated with the viewing user has sensed (via the sensor 32) information, data, or otherwise identified foodstuff, and that information has been stored in the user foodstuff database 51 and associated with the viewing user, the food-sharing application platform, the server 22, the recipe UI 462 can search, query, compare, or the like, the recipe database 25 based on a combination of the available foodstuff transactions 14 and the user's identified foodstuff stored in the user foodstuff database 51. In this sense, the recipe UI 462 can identify a set of recipes 481 from the recipe database 25 that comprise ingredient the viewing user already has, in combination with available foodstuff transactions 14 that can at least partially define or complete an ingredient list for the set of recipes 481. Non-limiting examples of the recipe UI 462 can separately identify the viewing user's ingredients 483 stored in the user foodstuff database 51 and the available ingredients 485 from the foodstuff transaction database 60.

Figure 8:
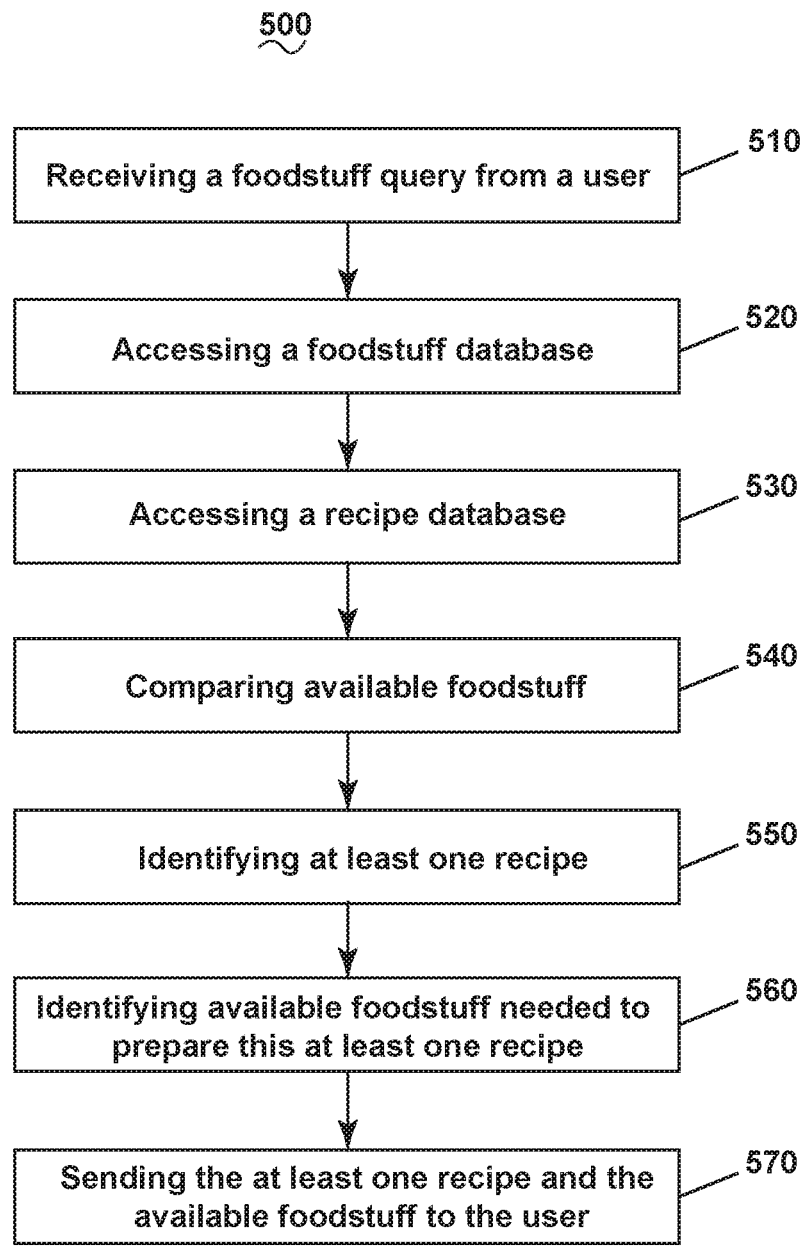
FIG. 8 is an example flowchart diagram of demonstrating a method of accessing a food-sharing application platform in accordance with various aspects described herein.

FIG. 8 illustrates a flow chart demonstrating a method 500 of accessing the food-sharing application platform. The method 500 begins by receiving, on a computer server 22, a foodstuff query from a food-sharing application user, the foodstuff query including the user's available foodstuff items, at 510. The method 500 can include accessing, by the computer server 22, a foodstuff database 60 defining a set of available foodstuff 14 from other users, at 520. At 530, the computer server 200, accesses a recipe database 25. At 540, the computer server 22 compares a combination of the user's available foodstuff items and the set of available foodstuff 14 with the list of foodstuff ingredients of the at least one recipe 12 and identifies at 550, at least one recipe 12 based on the comparing. The method 500 can then identify, by the computer server 22, available foodstuff 14 needed to prepare the identified at least one recipe 12, at 560, and send the identified at least one recipe 12 and the available foodstuff 14 needed to prepare the identified at least one recipe 12 to the food-sharing application user at 570.

Figure 9:
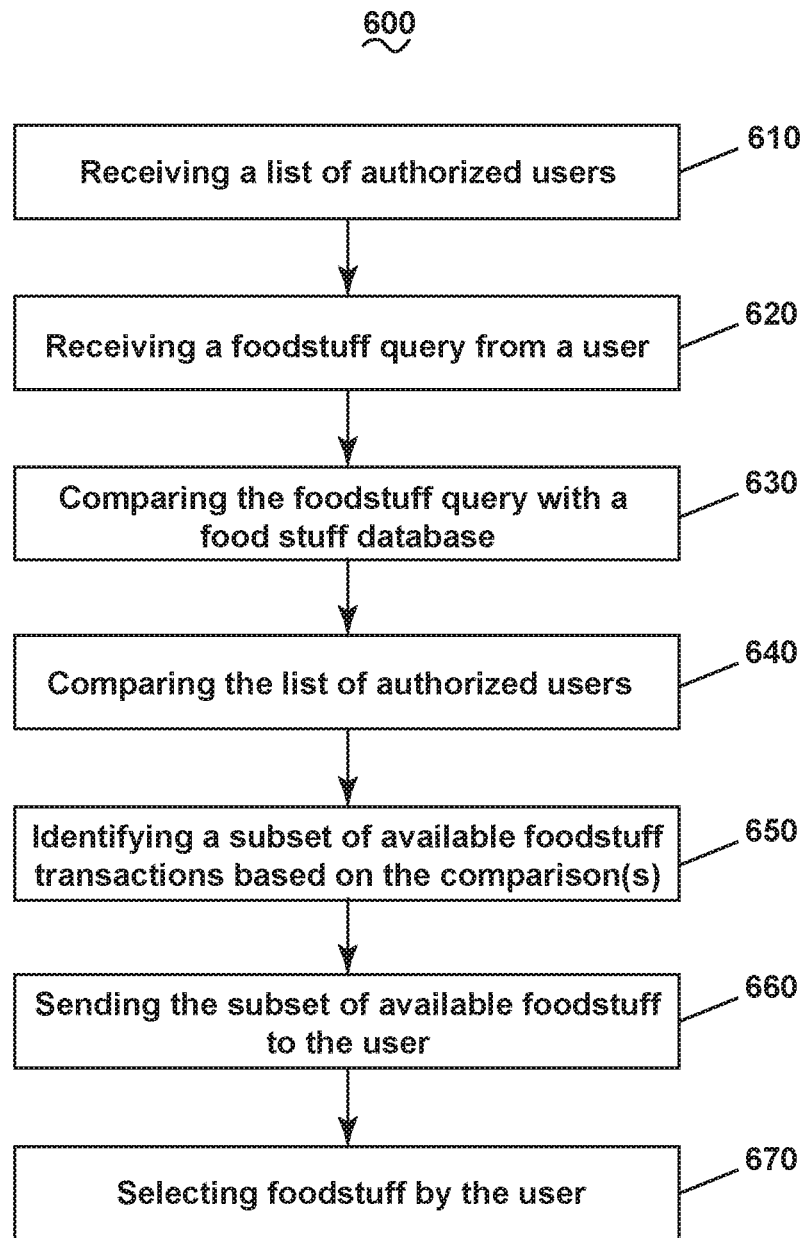
FIG. 9 is another example flowchart diagram of demonstrating a method of accessing a food-sharing application platform in accordance with various aspects described herein.

FIG. 9 illustrates a flow chart demonstrating another method 600 of accessing the food-sharing application platform. The method 600 begins by receiving, by a computer server 22, a list of authorized users from a food-sharing application user, at 610. The method 600 can also include receiving, by the computer server 22, a foodstuff query from the food-sharing application user, at 620. The method 600 compares, by the computer server 22, a first comparison of the foodstuff query with a foodstuff database 60 defining a set of available foodstuff transactions 14 and a set of users associated with the set of available foodstuff transactions 14, at 630. The method 600 also compares, by the computer server 22, a second comparison of the list of authorized users with the set of users associated with the set of available foodstuff transactions 14, at 640. The method 600 also identifies, by the computer server 22, a subset of available foodstuff transactions 14 in the foodstuff database 60, based on the first comparing and the second comparing, at 650, and sends the subset of available foodstuff transactions 14 to the food-sharing application user, at 660. The food-sharing application user can then select a foodstuff transaction 14 from the subset of available food stuff transactions 14, at 670.

The sequences depicted is for illustrative purposes only and is not meant to limit the methods 500, 600 in any way as it is understood that the portions of the methods 500, 600 can proceed in a different logical order, additional or intervening portions can be included, or described portions of the methods 500, 600 can be divided into multiple portions, or described portions of the methods 500, 600 can be omitted without detracting from the described methods 500, 600.

Many other possible aspects and configurations in addition to that shown in the above figures are contemplated by the present disclosure.

The aspects disclosed herein provide a system and method for accessing a food-sharing application platform. The technical effect is that the above described aspects enable the accessing, sending, or returning of data transmitted to effect the operation of the aforementioned food-sharing application platform and allowing users to reduce household food waste.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of implementing a food-sharing application platform, the method comprising:

receiving, on a computer server, a foodstuff query from a food-sharing application user, the foodstuff query including a set of the user's available foodstuff items;

accessing, by the computer server, a foodstuff database defining a set of available foodstuff items from other users;

accessing, by the computer server, a recipe database including at least one recipe having a list of foodstuff ingredients needed to prepare the at least one recipe;

comparing, by the computer server, a combination of the set of the user's available foodstuff items and the set of available foodstuff items from other users with the list of foodstuff ingredients of the at least one recipe;

identifying, by the computer server, the at least one recipe on the comparing;

identifying, by the computer server, available foodstuff items needed to prepare the identified at least one recipe; and sending instructions to display the identified at least one recipe and a location associated with the other users and the available foodstuff items needed to prepare the identified at least one recipe on a recipe user Interface.

2. The method of claim 1 wherein the available foodstuff items needed to prepare the identified at least one recipe is selectable by a food-sharing application user.

3. The method of claim 2, further comprising selecting the available foodstuff items needed to prepare the identified at least one recipe, by the food-sharing application user, navigating the food-sharing application user to a user interface adapted to provide foodstuff data related to the selected available foodstuff.

4. The method of claim 3, further comprising sending the foodstuff data from the foodstuff database.

5. The method of claim 1, further comprising sensing, by a food container sensor, the set of the user's available foodstuff items.

6. The method of claim 5, further comprising storing, by the computer server, the sensed set of the user's available foodstuff items in a user foodstuff database.

7. The method of claim 1 wherein the comparing further includes filtering the comparison based on at least one filter category.

8. The method of claim 7, further comprising identifying the at least one recipe based on a proximity to the available foodstuff to the food-sharing application user.

9. The method of claim 7, further comprising identifying the at least one recipe based on an authorized user list of other users, wherein the available foodstuff needed to prepare the identified at least one recipe is offered from a user from the authorized user list.

10. The method of claim 1, wherein identifying, by the computer server, the available foodstuff items needed to prepare the identified at least one recipe further comprises identifying at least a subset of the available foodstuff items from the user's available food-sharing application user.

11. The method of claim 1, wherein identifying, by the computer server, the available foodstuff needed to prepare the identified at least one recipe further comprises identifying at least a subset of the available foodstuff from the other users.

* * * * *